(12) United States Patent
Tawata et al.

(10) Patent No.: US 10,393,289 B2
(45) Date of Patent: Aug. 27, 2019

(54) PIPE FIXING DEVICE

(71) Applicants: TOYOTA JIDOSHA KABUSHIKI KAISHA, Toyota-shi, Aichi-ken (JP); Sanoh Industrial Co., Ltd., Tokyo (JP)

(72) Inventors: Kiyoshi Tawata, Toyota (JP); Takanori Kojima, Toyota (JP); Osamu Fujii, Bando (JP)

(73) Assignees: TOYOTA JIDOSHA KABUSHIKI KAISHA, Tokyo (JP); SANOH INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 15/591,415

(22) Filed: May 10, 2017

(65) Prior Publication Data

US 2017/0335993 A1 Nov. 23, 2017

(30) Foreign Application Priority Data

May 17, 2016 (JP) ................................. 2016-099027

(51) Int. Cl.

| F16L 3/00 | (2006.01) |
| F16L 3/10 | (2006.01) |
| F02M 35/00 | (2006.01) |
| F16L 11/15 | (2006.01) |
| B60R 16/02 | (2006.01) |

(52) U.S. Cl.
CPC .......... F16L 3/1091 (2013.01); F02M 35/00 (2013.01); B60R 16/0215 (2013.01); F16L 11/15 (2013.01)

(58) Field of Classification Search
CPC ...... F16L 3/1091; F16L 11/15; B60R 16/0215
USPC ........................... 138/106, 107; 248/68.1, 73
See application file for complete search history.

(56) References Cited

U.S. PATENT DOCUMENTS

| 3,526,934 A * | 9/1970 | Owen, Sr. ............. F16B 7/0433 138/106 |
| 4,199,070 A * | 4/1980 | Magnussen, Jr. ...... A47B 63/02 138/112 |
| 4,601,447 A * | 7/1986 | McFarland ............. F16L 3/222 248/49 |

(Continued)

FOREIGN PATENT DOCUMENTS

| CN | 202302324 U | 7/2012 |
| CN | 102667292 A | 9/2012 |

(Continued)

OTHER PUBLICATIONS

Partial Translation of Oct. 2, 2018 Office Action issued in Japanese Patent Application No. 2016-099027.

*Primary Examiner* — James F Hook
(74) *Attorney, Agent, or Firm* — Oliff PLC

(57) ABSTRACT

A pipe fixing device includes: first and second clamps that fix a pipe; and first and second engaging parts that are fixed to the pipe and engage respectively with the first and second clamps. The first clamp and the first engaging part configured to engage with each other such that the first engaging part is restrained from moving toward one side in an axial direction of the pipe and from moving in a circumferential direction of the pipe relative to the first clamp. The second clamp and the second engaging part configured to engage with each other such that the second engaging part is restrained from moving toward another side in the axial direction of the pipe and from moving in the circumferential direction of the pipe relative to the second clamp.

8 Claims, 3 Drawing Sheets

(56) References Cited

U.S. PATENT DOCUMENTS

| | | | | |
|---|---|---|---|---|
| 4,640,531 A * | 2/1987 | Forster | ................ | F16L 23/003 |
| | | | | 285/24 |
| 5,794,897 A * | 8/1998 | Jobin | .................... | H02G 7/053 |
| | | | | 24/459 |
| 5,941,483 A * | 8/1999 | Baginski | .................. | F16L 3/22 |
| | | | | 248/68.1 |
| 5,992,802 A * | 11/1999 | Campbell | ................ | H02G 3/30 |
| | | | | 248/68.1 |
| 6,007,029 A * | 12/1999 | Barriger | ............... | F16L 3/2235 |
| | | | | 165/172 |
| 6,648,377 B2 * | 11/2003 | Marandi | ................ | F16L 41/06 |
| | | | | 285/197 |
| 7,464,966 B2 * | 12/2008 | Miyajima | ................ | F16L 5/10 |
| | | | | 285/124.3 |
| 8,245,733 B2 * | 8/2012 | Renaud | .................... | F16L 3/06 |
| | | | | 138/106 |
| 8,439,317 B2 * | 5/2013 | Sampson | .............. | F16L 3/1083 |
| | | | | 248/63 |
| 2003/0025048 A1 * | 2/2003 | Knotts | ................. | F16L 3/2235 |
| | | | | 248/68.1 |
| 2004/0256522 A1 * | 12/2004 | Takahashi | ............ | B60K 15/035 |
| | | | | 248/68.1 |
| 2005/0116122 A1 * | 6/2005 | Nakanishi | ............... | F16L 3/223 |
| | | | | 248/68.1 |
| 2007/0246616 A1 * | 10/2007 | Budagher | ................ | F16L 3/11 |
| | | | | 248/68.1 |
| 2008/0217489 A1 * | 9/2008 | Higbee | ................ | F28F 9/0132 |
| | | | | 248/68.1 |
| 2009/0224111 A1 * | 9/2009 | Gilbreath | ................ | F16L 3/222 |
| | | | | 248/68.1 |
| 2011/0147541 A1 * | 6/2011 | Frantz | ................... | F16L 3/2332 |
| | | | | 248/68.1 |
| 2011/0239960 A1 * | 10/2011 | Komai | .................. | F22B 37/205 |
| | | | | 122/493 |
| 2011/0303456 A1 * | 12/2011 | Blanchard | ............ | F16L 3/1091 |
| | | | | 174/480 |
| 2013/0074971 A1 * | 3/2013 | Sakamoto | ................ | F16L 3/00 |
| | | | | 138/106 |
| 2014/0000745 A1 * | 1/2014 | Bednarz | ............. | F01N 13/1822 |
| | | | | 138/106 |
| 2017/0191583 A1 * | 7/2017 | Won | ...................... | F16L 3/1016 |

FOREIGN PATENT DOCUMENTS

| | | |
|---|---|---|
| JP | 03-030684 U | 3/1991 |
| JP | H05-47669 U | 6/1993 |
| JP | H05-263971 A | 10/1993 |
| JP | H10-9465 A | 1/1998 |
| JP | 2000-337557 A | 12/2000 |
| JP | 2009-191879 A | 8/2009 |
| WO | 2011/060227 A2 | 5/2011 |

* cited by examiner

PIPE FIXING DEVICE

INCORPORATION BY REFERENCE

The disclosure of Japanese Patent Application No. 2016-099027 filed on May 17, 2016 including the specification, drawings and abstract is incorporated herein by reference in its entirety.

BACKGROUND

1. Technical Field

The present disclosure relates to a pipe fixing device.

2. Description of Related Art

A corrugated tube is known in which annular recesses and protrusions (hereinafter referred to as corrugations) are formed continuously at a constant pitch in the axial direction. There is a known technique of installing a partially corrugated resin tube through a clamp (e.g., see Japanese Patent Application Publication No. 2000-337557). According to the technique, rib walls formed on an inner circumferential surface of the clamp are fitted into an annular recess, and large-diameter portions of the annular recess are received in reception openings formed between the rib walls, such that displacement of the resin tube in both the axial direction and the circumferential direction is prevented.

SUMMARY

However, it can be difficult to form corrugations on pipes, including resin tubes, depending on the materials thereof. For example, stainless steel (SUS) pipes are often harder than resin tubes, and forming corrugations on such pipes is difficult. Even when corrugations are formed on a pipe, concentration of bending stress at the corrugated part, where the pipe has a reduced thickness, may degrade the reliability of the bending function of the pipe. Thus, the above technique is unlikely to be able to suppress displacement of such pipes in both the axial direction and the circumferential direction.

The present disclosure provides a pipe fixing device that can suppress displacement of a pipe in the axial direction and the circumferential direction regardless of the material of the pipe.

A pipe fixing device according to a first aspect of the present disclosure includes: a first clamp and a second clamp that fix a pipe; and a first engaging part and a second engaging part that are fixed to the pipe and engage respectively with the first clamp and the second clamp. The first clamp and the first engaging part are configured to engage with each other such that the first engaging part is restrained from moving toward one side in an axial direction of the pipe and from moving in a circumferential direction of the pipe relative to the first clamp. The second clamp and the second engaging part are configured to engage with each other such that the second engaging part is restrained from moving toward another side in the axial direction of the pipe and from moving in the circumferential direction of the pipe relative to the second clamp.

A pipe fixing device according to a second aspect of the present disclosure includes: a clamp that fixes a pipe; and an engaging part that is fixed to the pipe and engages with the clamp. The clamp and the engaging part are configured to engage with each other such that the engaging part is restrained from moving toward one side in an axial direction of the pipe and from moving in a circumferential direction of the pipe relative to the clamp.

A pipe fixing device according to a third aspect of the present disclosure includes: a clamp that fixes a pipe; and a bracket that is at one end welded to an outer circumferential surface of the pipe and at another end separated from the pipe. The clamp includes a first clamp part and a second clamp part. The first clamp part has a U-shaped holding portion in which the pipe is held. Another end of the bracket is held between the first clamp part and the second clamp part along with the pipe.

According to the present disclosure, it is possible to suppress displacement of a pipe in the axial direction and the circumferential direction regardless of the material of the pipe.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure will be described below with reference to the drawings.

First Embodiment

Figure 1:
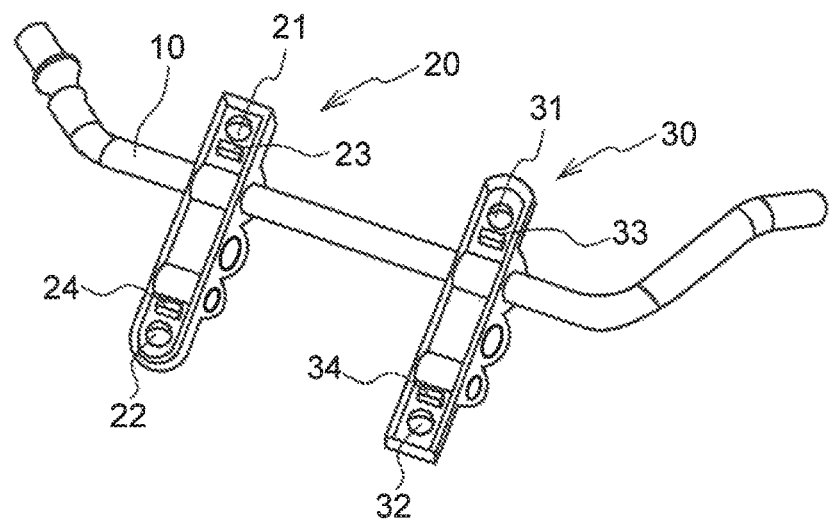
FIG. 1 is a perspective view showing an example of a pipe fixing device according to a first embodiment.

FIG. 1 is a perspective view showing an example of a fixing device of a pipe 10 according to a first embodiment. As shown in FIG. 1, the pipe 10 is held by a pair of first clamp (e.g., resin clamp) 20 and second clamp 30 that are disposed at a predetermined interval. In FIG. 1, the first clamp 20 and the second clamp 30 hold one pipe 10, but the number of the pipes 10 to be held by the first and second clamps 20, 30 is not limited to one, and a plurality of pipes may be held by these clamps. In FIG. 1, the first and second clamps 20, 30 can hold up to three pipes 10. The pipe 10 is made of stainless steel (SUS), for example, and a fluid flows through the inside of the pipe 10. The fluid refers to, for example, engine oil, engine cooling water (long life coolant; LLC), brake oil, or fuel.

Openings 21, 22, 31, 32 are formed at both ends in a longitudinal direction of the first and second clamps 20, 30, respectively. A shaft part of a bolt is passed through each of the openings 21, 22, 31, 32. The shafts of the bolts passed through the openings 21, 22, 31, 32 are fixed by being inserted into bolt holes provided in an engine or a vehicle body. Thus, the pipe 10 is fixed to the engine or the vehicle body through the clamps 20, 30.

As will be described in detail later, joint pieces 23, 24 are formed on opposite sides of the pipe 10 between the openings 21, 22. Joint pieces 33, 34 are formed on opposite sides of the pipe 10 between the openings 31, 32.

Figure 2:
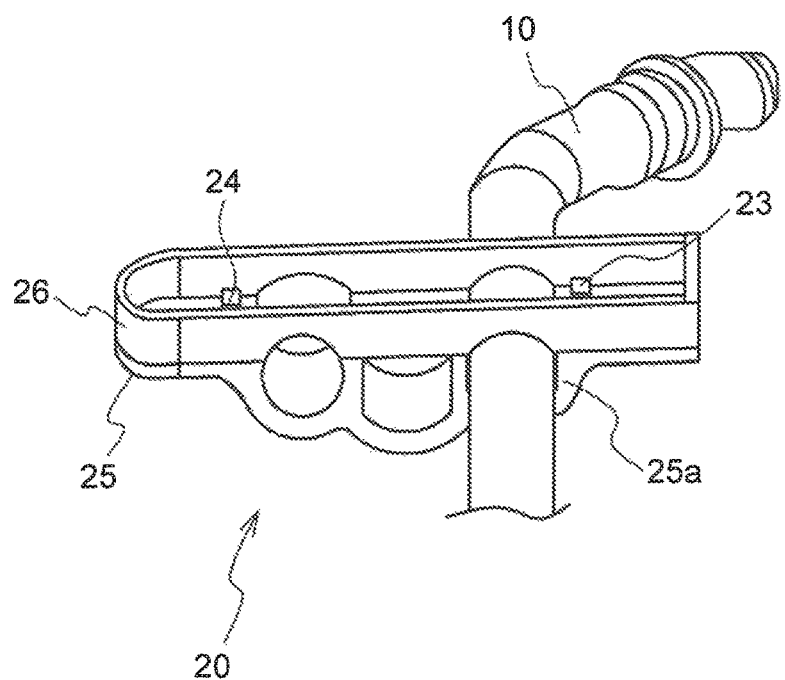
FIG. 2 is a perspective view showing another example of the pipe fixing device according to the first embodiment.
Figure 3:
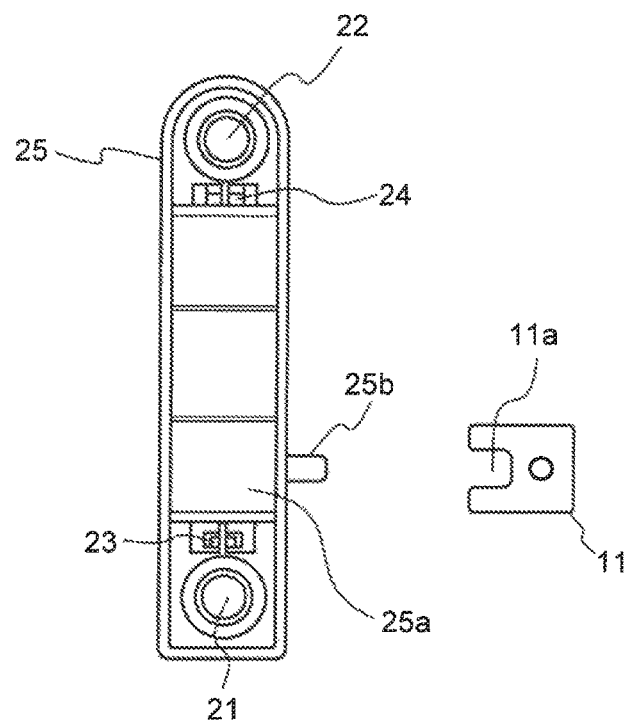
FIG. 3 is an example of a bottom view of a first clamp member and a plate according to the first embodiment.

FIG. 2 is a perspective view showing another example of the fixing device of the pipe 10 according to the first embodiment. FIG. 3 is an example of a bottom view of a first clamp member 25 and a plate 11 according to the first embodiment. FIG. 2 shows an enlarged view of a portion of the first clamp 20 in which the pipe 10 is held. The first clamp 20 includes the first clamp member 25 and a second clamp member 26. The first clamp 20 can be divided into the first clamp member 25 and the second clamp member 26. Specifically, releasing the joint pieces 23, 24 (see also FIG. 3) can divide the first clamp 20 into the first clamp member 25 and the second clamp member 26.

As shown in FIG. 2 and FIG. 3, the first clamp member 25 includes a holding portion 25a in which the pipe 10 is held. The holding portion 25a is formed in a U-shape. This makes it possible to hold the pipe 10, which has an annular cross-sectional shape, without leaving a large clearance between the holding portion 25a and the pipe 10. As shown in FIG. 2, the pipe 10 placed in the holding portion 25a is held between the first clamp member 25 and the second clamp member 26, and these clamp members are joined together with the joint pieces 23, 24. Thus, the first clamp 20 holds the pipe 10. The second clamp 30 has the same configuration as the first clamp 20.

Although hidden behind the pipe 10 in FIG. 2, a protrusion 25b extending along an axial direction of the pipe 10 is provided on an edge of the holding portion 25a of the first clamp member 25 as shown in FIG. 3. As shown in FIG. 3, the plate 11 having a recess 11a is provided as an engaging part in a predetermined region of an outer circumferential surface of the pipe 10 close to the holding portion 25a. As will be described in detail later, displacement of the pipe 10 in a circumferential direction is suppressed as the protrusion 25b of the first clamp member 25 and the recess 11a of the plate 11 engage with each other.

Figure 4:
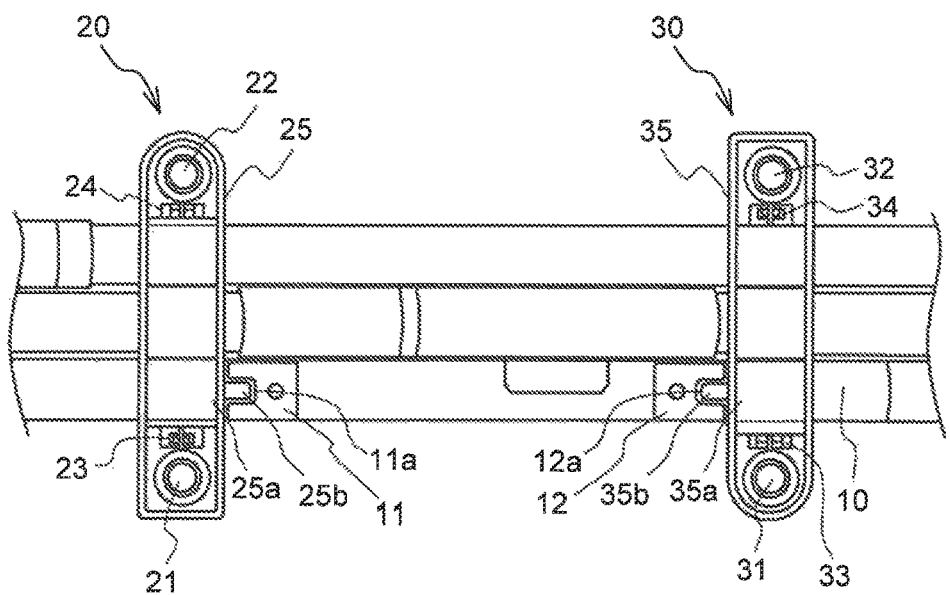
FIG. 4 is a bottom view showing another example of the pipe fixing device according to the first embodiment.

FIG. 4 is a bottom view showing another example of the fixing device of the pipe 10 according to the first embodiment. Described below is a case where the ratio between the numbers of the protrusion 25b of the first clamp member 25 and the recess 11a of the plate 11 is one to one. However, the ratio between the numbers of the protrusion 25b of the first clamp member 25 and the recess 11a of the plate 11 may be two to two, or one to two or more.

As described above, the first clamp member 25 is provided with the protrusion 25b extending along the axial direction of the pipe 10. The pipe 10 is provided with the plate 11 having the recess 11a, in a predetermined region of the outer circumferential surface close to the holding portion 25a. Specifically, the plate 11 is welded (more specifically, brazed) to the outer circumferential surface of the pipe 10. As brazing is adopted, even when some shock is given to the pipe 10, the plate 11 remains fixed at least more reliably than when fixed with an adhesive. Since a brazing material does not melt up to approximately 1000° C., it is highly unlikely that the brazing material melts as a fluid flows through the inside of the pipe 10.

On the other hand, the first clamp member 35 of the clamp 30 is provided with a protrusion 35b extending along the axial direction of the pipe 10. The pipe 10 is provided with a plate 12 having a recess 12a as an engaging part, in another region of the outer circumferential surface close to a holding portion 35a that is different from the above-mentioned predetermined region. As with the plate 11, the plate 12 is also welded (specifically, brazed) to the outer circumferential surface of the pipe 10. Thus, displacement of the pipe 10 in the circumferential direction is also suppressed as the protrusion 35b of the first clamp member 35 and the recess 12a of the plate 12 engage with each other.

Here, as shown in FIG. 4, the protrusion 25b of the first clamp member 25 of the first clamp 20 and the protrusion 35b of the first clamp member 35 of the second clamp 30 are provided so as to face each other. The plate 11 is provided in a region where the protrusion 25b and the recess 11a engage with each other, and the plate 12 is provided in a region where the protrusion 35b and the recess 12a engage with each other. Thus, even when one tries to move the pipe 10 to either side in the axial direction, the protrusion 25b and the recess 11a hit against each other, or the protrusion 35b and the recess 12a hit against each other, such that displacement of the pipe 10 in the axial direction is suppressed.

It is desirable that there is a clearance small enough to suppress displacement of the pipe 10 in the axial direction and the circumferential direction, in an engaging portion between the protrusion 25b and the recess 11a and in an engaging portion between the protrusion 35b and the recess 12a. Even when there is a variation in size of the plates 11, 12 (specifically, size of the recesses 11a, 12a), or a variation in size of the first clamp members 25, 35 (specifically, size of the protrusions 25b, 35b), such a clearance allows the pipe 10 to be fixed to the engine or the vehicle body without much effort of engaging these parts with each other.

The protrusion 25b and the recess 11a desirably have similar thicknesses, and more desirably have such thicknesses that the protrusion 25b and the recess 11a at least half overlap with each other. Thus, displacement in the circumferential direction can be stably suppressed.

As has been described above, the fixing device of the pipe 10 according to the first embodiment includes the clamps 20, 30 that fix the pipe 10, and the plates 11, 12 that are fixed to the pipe 10 and engage respectively with the clamps 20, 30. The clamp 20 and the plate 11 engage with each other such that the plate 11 is restrained from moving toward one side in the axial direction of the pipe 10 and from moving in the circumferential direction of the pipe 10 relative to the clamp 20. The clamp 30 and the plate 12 engage with each other such that the plate 12 is restrained from moving toward the other side in the axial direction of the pipe 10 and from moving in the circumferential direction of the pipe 10 relative to the clamp 30. Thus, displacement of the pipe 10 in the axial direction and the circumferential direction can be suppressed. In particular, the fixing device of the pipe 10 according to the first embodiment uses the plates 11, 12, without corrugations being formed on the pipe 10. Using these plates 11, 12, the fixing device can suppress displacement of the pipe 10 in the axial direction and the circumferential direction regardless of the material of the pipe 10, even when the material of the pipe 10 makes it difficult to form corrugations on the pipe 10.

Accordingly, displacement of the pipe 10 in both the axial direction and the circumferential direction is suppressed before the pipe 10 is fixed to the engine or the vehicle body through the clamps 20, 30, such that work of manually fixing the pipe 10 to the engine or the vehicle body is not hindered.

In the first embodiment, the case has been described where the protrusion 25b of the first clamp member 25 and the protrusion 35b of the first clamp member 35 are provided so as to face each other. However, the present disclosure is not limited to the embodiment. For example, recesses facing each other along the axial direction may be provided respectively on the edges of the holding portions 25a, 35a of the first clamp members 25, 35, and these recesses may be engaged with protrusions provided on the plates 11, 12. The embodiment can also suppress displacement of the pipe 10 in the axial direction and the circumferential direction.

In the above embodiment, the plates 11, 12 are brazed in an inner region located between the first clamp members 25, 35. Alternatively, the plates 11, 12 may be brazed in outer regions that are not located between the first clamp members 25, 35, on opposite sides of the inner region. In this case, if the plates 11, 12 each have a recess, the plates 11, 12 are brazed with the recesses facing each other, and protrusions are provided on the first clamp members 25, 35 so as to engage with the recesses. Conversely, if the plates 11, 12 each have a protrusion, the plates 11, 12 are brazed with the protrusions facing each other, and recesses are provided in the first clamp members 25, 35 so as to engage with the protrusions. The embodiment can also suppress displacement of the pipe 10 in the axial direction and the circumferential direction.

Moreover, in the case where the plates 11, 12 are brazed in the above-mentioned outer regions on opposite sides of the inner region, the plate 11 having a protrusion and the first clamp member 25 having a recess may be engaged with each other, while the plate 12 having a recess and the first clamp member 35 having a protrusion may be engaged with each other. Conversely, the plate 11 having a recess and the first clamp member 25 having a protrusion may be engaged with each other, while the plate 12 having a protrusion and the first clamp member 35 having a recess may be engaged with each other. The embodiment can also suppress displacement of the pipe 10 in the axial direction and the circumferential direction.

Second Embodiment

Figure 5:
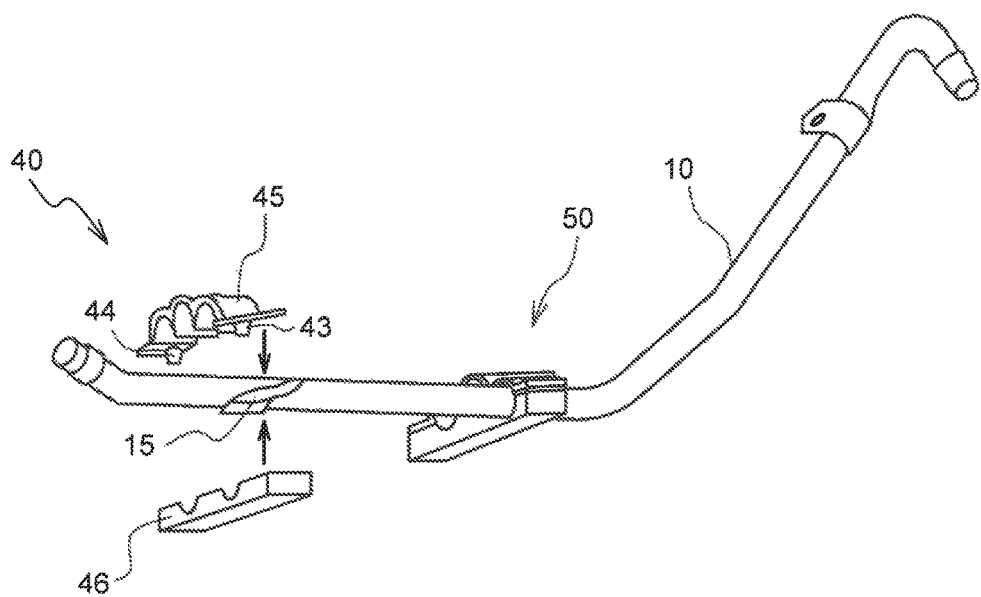
FIG. 5 is a perspective view showing an example of a pipe fixing device according to a second embodiment.
Figure 6:
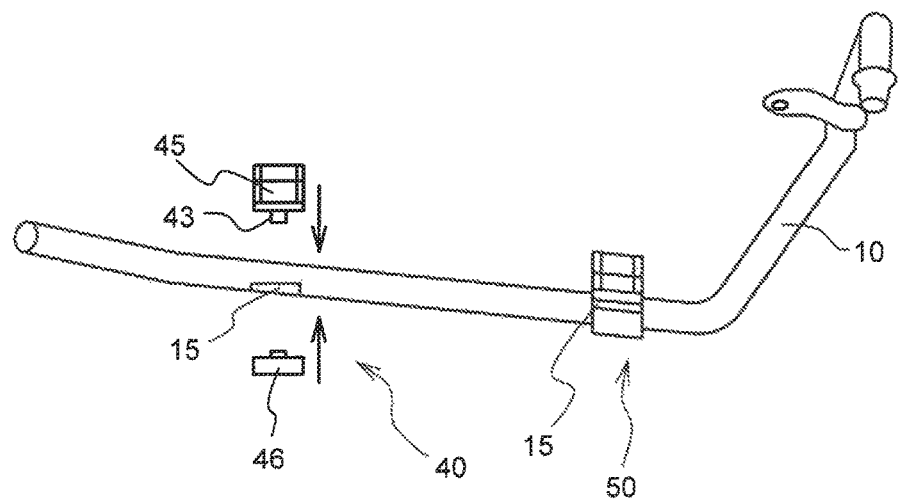
FIG. 6 is a perspective view showing another example of the pipe fixing device according to the second embodiment.

Next, a second embodiment of the present disclosure will be described with reference to FIG. 5 and FIG. 6. FIG. 5 is a perspective view showing an example of a fixing device of the pipe 10 according to the second embodiment. FIG. 6 is a perspective view showing another example of the fixing device of the pipe 10 according to the second embodiment. While a clamp 40 will be described as an example below, a clamp 50 has the same configuration as the clamp 40.

In the fixing device of the pipe 10 according to the second embodiment, a bracket 15 is provided in a predetermined region of the outer circumferential surface of the pipe 10 as shown in FIG. 5 and FIG. 6. Specifically, one end of the bracket 15 is welded (more specifically, brazed) to the outer circumferential surface of the pipe 10. Thus, the bracket 15 is fixed to the pipe 10. The other end of the bracket 15 extends in a direction away from the pipe 10.

The other end of the bracket 15 is held by the clamp 40. Specifically, as with the clamp 20 described in the first embodiment, the clamp 40 includes a first clamp member 45 and a second clamp member 46, and the clamp 40 can be divided into the first clamp member 45 and the second clamp member 46. Specifically, releasing joint pieces 43, 44 can divide the clamp 40 into the first clamp member 45 and the second clamp member 46.

By holding the other end of the bracket 15 along with the pipe 10, the clamp 40 holds the pipe 10 through the bracket 15. As the bracket 15 is brazed to the pipe 10, the clamp 40 holding the bracket 15 moves neither in the axial direction nor in the circumferential direction of the pipe 10.

Thus, according to the fixing device of the pipe 10 of the second embodiment, the pipe 10 is fixed to the engine or the vehicle body through the clamp 40, with one end of the bracket 15 being brazed to the pipe 10 and the other end of the bracket 15 being held by the clamp 40 along with the pipe 10. Thus, displacement of the pipe 10 in both the axial direction and the circumferential direction is suppressed. The fixing device of the pipe 10 according to the second embodiment uses the bracket 15, without corrugations being formed on the pipe 10. Using the bracket 15, the fixing device can suppress displacement of the pipe 10 in the axial direction and the circumferential direction regardless of the material of the pipe 10, even when the material of the pipe 10 makes it difficult to form corrugations on the pipe 10.

While the preferred embodiments of the present disclosure have been described in detail above, the present disclosure is not limited to these specific embodiments but can be variously changed or modified within the scope of the disclosure described in the claims.

What is claimed is:
1. A pipe fixing device, comprising:
a first clamp and a second clamp that fix a pipe; and
a first engaging part and a second engaging part that are fixed to the pipe and engage respectively with the first clamp and the second clamp, wherein
the first clamp and the first engaging part are configured to engage with each other such that the first engaging part is restrained from moving toward one side in an axial direction of the pipe and from moving in a circumferential direction of the pipe relative to the first clamp,
the first engaging part being adjacent to the first clamp in the axial direction of the pipe without overlapping the first clamp in plan view,
the second clamp and the second engaging part are configured to engage with each other such that the second engaging part is restrained from moving toward another side in the axial direction of the pipe and from moving in the circumferential direction of the pipe relative to the second clamp,
the second engaging part being adjacent to the second clamp in the axial direction of the pipe without overlapping the second clamp in plan view,
one of the first clamp and the first engaging part has a first recess recessing in the axial direction of the pipe, and the other one of the first clamp and the first engaging part has a first protrusion protruding along the axial direction of the pipe,
one of the second clamp and the second engaging part has a second recess recessing in the axial direction of the pie, and the other one of the second clamp and the second engaging part has a second protrusion protruding along the axial direction of the pipe,
the first engaging part and the first clamp are configured to have the first recess and the first protrusion thereof engaged with each other in the axial direction of the pipe, the first recess and the first protrusion being located in an inner region located between, in the axial direction of the pipe, the first clamp and the second clamp, and
the second engaging part and the second clamp are configured to have the second recess and the second protrusion thereof engaged with each other in the axial direction of the pipe, the second recess and the second protrusion being located in the inner region.
2. The pipe fixing device according to claim 1, wherein the first engaging part and the second engaging part are welded to an external surface of the pipe.

3. The pipe fixing device according to claim 1, wherein
the first clamp includes a first clamp part and a second clamp part, and
the first clamp part has a U-shaped holding portion in which the pipe is held, and the first clamp part and the second clamp part are configured to hold the pipe therebetween.

4. The pipe fixing device according to claim 3, wherein the first clamp includes a joint piece configured to join together the first clamp part and the second clamp part, and is configured to be divided into the first clamp part and the second clamp part as the joint piece is released.

5. A pipe fixing device, comprising:
a first clamp and a second clamp that fix a pipe; and
a first engaging part and a second engaging part that are fixed to the pipe and engage respectively with the first clamp and the second clamp, wherein
the first clamp and the first engaging part are configured to engage with each other such that the first engaging part is restrained from moving toward one side in an axial direction of the pipe and from moving in a circumferential direction of the pipe relative to the first clamp, the first engaging part being adjacent to the first clamp in the axial direction of the pipe without overlapping the first clamp in plan view,
the second clamp and the second engaging part are configured to engage with each other such that the second engaging part is restrained from moving toward another side in the axial direction of the pipe and from moving in the circumferential direction of the pipe relative to the second clamp, the second engaging part being adjacent to the second clamp in the axial direction of the pipe without overlapping the second clamp in plan view,
one of the first clamp and the first engaging part has a first recess recessing in the axial direction of the pie, and the other one of the first clamp and the first engaging part has a first protrusion protruding along the axial direction of the pipe,
one of the second clamp and the second engaging part has a second recess recessing in the axial direction of the pie, and the other one of the second clamp and the second engaging part has a second protrusion protruding along the axial direction of the pipe,
the first engaging part and the first clamp are configured to have the first recess and the first protrusion thereof engaged with each other in the axial direction of the pipe, the first recess and the first protrusion being located in an outer region that is not between, in the axial direction of the pipe, the first clamp and the second clamp, and
the second engaging part of the second clamp are configured to the second recess and the second protrusion thereof engaged with each other in the axial direction of the pipe, the second recess and the second protrusion being located in the outer region.

6. The pipe fixing device according to claim 5, wherein the first engaging part and the second engaging part are welded to an external surface of the pipe.

7. The pipe fixing device according to claim 5 wherein
the first clamp includes a first clamp part and a second clamp part, and
the first clamp part has a U-shaped holding portion in which the pipe is held, and the first clamp part and the second clamp part are configured to hold the pipe therebetween.

8. The pipe fixing device according to claim 7, wherein the first clamp includes a joint piece configured to join together the first clamp part and the second clamp part, and is configured to be divided into the first clamp part and the second clamp part as the joint piece is released.

* * * * *